US 12,403,806 B2

(12) United States Patent
Dillinger (10) Patent No.: US 12,403,806 B2
(45) Date of Patent: Sep. 2, 2025

(54) HEAD RESTRAINT FOR A VEHICLE SEAT, AND VEHICLE SEAT

(71) Applicant: Adient US LLC, Plymouth, MI (US)

(72) Inventor: Thomas Dillinger, Ratingen (DE)

(73) Assignee: Adient US LLC, Plymouth, MI (US)

( * ) Notice: Subject to any disclaimer, the term of this patent is extended or adjusted under 35 U.S.C. 154(b) by 266 days.

(21) Appl. No.: 18/264,441

(22) PCT Filed: Feb. 15, 2022

(86) PCT No.: PCT/IB2022/051320
§ 371 (c)(1),
(2) Date: Aug. 7, 2023

(87) PCT Pub. No.: WO2022/175806
PCT Pub. Date: Aug. 25, 2022

(65) Prior Publication Data
US 2024/0101009 A1    Mar. 28, 2024

(30) Foreign Application Priority Data

Feb. 16, 2021  (DE) ...................... 10 2021 103 644.5
May 11, 2021  (DE) ...................... 10 2021 112 215.5

(51) Int. Cl.
*H04R 1/02*       (2006.01)
*B60N 2/42*       (2006.01)
(Continued)

(52) U.S. Cl.
CPC .................... *B60N 2/879* (2018.02)

(58) Field of Classification Search
CPC ........ H04R 1/025; H04R 5/023; B60N 2/879; B60R 11/0217; B60R 2011/0017
(Continued)

(56) References Cited

U.S. PATENT DOCUMENTS 6,324,294 B1   11/2001  Azima et al.
9,088,842 B2 *  7/2015  Silverstein ............... H04R 1/02
(Continued)

FOREIGN PATENT DOCUMENTS

DE    102005015292 B3   11/2006
DE    102015212510 A1    1/2017
(Continued)

OTHER PUBLICATIONS

European Patent Office, International Search Report and Written Opinion in Application No. PCT/IB2022/051320 dated May 6, 2022, 12 pages, Rijswijk, Netherlands.

*Primary Examiner* — Shin H Kim
(74) *Attorney, Agent, or Firm* — Marshall & Melhorn, LLC (57) ABSTRACT

A head restraint for a vehicle seat may have a head restraint support, a first loudspeaker unit, and at least one second loudspeaker unit. The head restraint may also have a lining element and a cover. The lining element covers the head restraint support, the first loudspeaker unit and the at least one second loudspeaker unit in the direction of a contact surface. The cover covers the head restraint support, the first loudspeaker unit and the at least one second loudspeaker unit in a direction opposite to the contact surface. The lining element, the head restraint support and the cover are designed in such a way that a sound generated by the first loudspeaker unit can be emitted from the head restraint to an external environment of the head restraint in a largely unattenuated manner. A vehicle seat having a backrest and the head restraint is also provided.

15 Claims, 5 Drawing Sheets

(51) Int. Cl.
*B60N 2/58* (2006.01)
*B60N 2/879* (2018.01)

(58) Field of Classification Search
USPC ............... 181/199, 287; 297/217.4; 381/333
See application file for complete search history.

(56) References Cited

U.S. PATENT DOCUMENTS

| | | | |
|---|---|---|---|
| 9,403,454 B2* | 8/2016 | Subat | ....................... H04R 5/02 |
| 2007/0024097 A1 | 2/2007 | Shiraishi | |
| 2007/0169988 A1* | 7/2007 | Chang | .................... H04R 1/023 |
| | | | 181/199 |
| 2014/0270322 A1* | 9/2014 | Silverstein | ........... B60N 2/4214 |
| | | | 381/391 |
| 2016/0137106 A1* | 5/2016 | Subat | ..................... H04R 1/023 |
| | | | 381/389 |
| 2016/0255430 A1 | 9/2016 | Fujita et al. | |
| 2016/0368403 A1* | 12/2016 | Kobayashi | ............... B60N 2/80 |
| 2018/0312091 A1 | 11/2018 | Subat et al. | |
| 2019/0375324 A1 | 12/2019 | Subat et al. | |

FOREIGN PATENT DOCUMENTS

| | | |
|---|---|---|
| DE | 102019206715 A1 | 11/2020 |
| EP | 3274215 B1 | 5/2019 |
| JP | 2009247388 A | 10/2009 |
| JP | 2015100026 A | 5/2015 |
| WO | 2017005660 A1 | 1/2017 |
| WO | 2019121266 A1 | 6/2019 |
| WO | 2020224945 A1 | 11/2020 |

\* cited by examiner

HEAD RESTRAINT FOR A VEHICLE SEAT, AND VEHICLE SEAT

FIELD

The invention relates to a headrest for a vehicle seat, having a headrest carrier, a first loudspeaker unit and at least one second loudspeaker unit, wherein the first loudspeaker unit and the at least one second loudspeaker unit are carried by the headrest carrier, the headrest further having a trim element and a cover, wherein the trim element covers the headrest carrier, the first loudspeaker unit and the at least one second loudspeaker unit in the direction of an abutment face, and the cover covers the headrest carrier, the first loudspeaker unit and the at least one second loudspeaker unit in a direction counter to the abutment face. The invention further relates to a vehicle seat.

BACKGROUND

There are generally known from the prior art headrests for vehicles, wherein a filling material in the form of a foam is arranged between an outer trim and an inner connection member for connecting the headrest to a headrest retention member. In known headrests, for example, there is provision in this instance for a preformed foam member to be used to fill the headrest member.

DE 10 2005 015 292 B3 discloses such a headrest for a vehicle. The headrest comprises a headrest member and a headrest retention member, wherein a trim is provided at the outer side of the headrest member. Inside the headrest member, a connection member for connecting the headrest retention member to the headrest member is provided, wherein filling material which is made of foam is arranged between the connection member and the trim. The filling material is constructed to be liquid in the processing state thereof, wherein the connection member and the trim define a substantially fluid-tight spatial region with respect to the filling material in the processing state thereof. Furthermore, a method for producing the headrest is described.

DE 10 2015 212 510 A1 discloses a headrest with a headrest member which has at least one frame with one or more internal, flexible support elements which form an abutment face, and which is produced by initially being formed from a plastics material, in particular a material which is free from foamed materials, or a composite material.

EP 3 274 215 B1 discloses a headrest with an integrated functional module, wherein the functional module is a loudspeaker unit.

WO 2019/121266 A1 discloses a headrest with a dipole loudspeaker. The dipole loudspeaker is suitable for producing sound at bass frequencies. The dipole loudspeaker has a diaphragm having a first radiation face and a second radiation face, wherein the first radiation face and the second radiation face are located at opposite sides of the diaphragm, and wherein the first and second radiation faces each have a surface-area of at least 100 cm$^2$. The dipole loudspeaker further has a drive unit which is configured to move the diaphragm at bass frequencies so that the first and second radiation faces generate sound at bass frequencies, wherein the sound generated by the first radiation face is in phase opposition to the sound generated by the second radiation face.

SUMMARY

An object of the invention is to improve a headrest of the type mentioned in the introduction, in particular a headrest with integrated loudspeakers with a reduced required structural space and at the same time to propose an expanded acoustic frequency range and to provide a corresponding vehicle seat.

This object is achieved according to the invention by a headrest for a vehicle seat, having a headrest carrier, a first loudspeaker unit and at least one second loudspeaker unit, wherein the first loudspeaker unit and the at least one second loudspeaker unit are carried by the headrest carrier, the headrest further having a trim element and a cover, wherein the trim element covers the headrest carrier, the first loudspeaker unit and the at least one second loudspeaker unit in the direction of an abutment face, and the cover covers the headrest carrier, the first loudspeaker unit and the at least one second loudspeaker unit in a direction counter to the abutment face.

In that the trim element, the headrest carrier and the cover are configured in such a manner that a sound, which is generated by the first loudspeaker unit, in particular by a diaphragm of the first loudspeaker unit, can be output, in particular in a direction perpendicular to the diaphragm of the first loudspeaker unit, from the headrest to an external environment of the headrest in a substantially non-damped manner, it becomes possible to use the principle of so-called "open acoustic baffle". The term "substantially non-damped" is intended to be understood to mean in this instance a specific air flow resistance of less than 200 Pa s/m. Values greater than 200 Pa s/m are not intended to be included by the term "substantially non-damped". Preferably, the specific air flow resistance is less than 100 Pa s/m, extremely preferably less than 25 Pa s/m, in each case measured in accordance with ISO 9053, Method B.

Advantageous embodiments which can be used individually or in conjunction with each other are set out in the dependent claims.

The specific air flow resistance of the trim element may be less than 200 Pa s/m, in particular less than 100 Pa s/m, extremely preferably less than 25 Pa s/m. The specific air flow resistance of the trim element in a region which covers the first loudspeaker unit and/or the at least one second loudspeaker unit may be less than 200 Pa s/m, in particular less than 100 Pa s/m, extremely preferably less than 25 Pa s/m, in each case measured in accordance with ISO 9053, Method B.

The specific air flow resistance of the cover may be less than 200 Pa s/m, in particular less than 100 Pa s/m, extremely preferably less than 25 Pa s/m. The specific air flow resistance of the cover in a region which covers the first loudspeaker unit and/or the at least one second loudspeaker unit may be less than 200 Pa s/m, in particular less than 100 Pa s/m, extremely preferably less than 25 Pa s/m, in each case measured in accordance with ISO 9053, Method B.

The first loudspeaker unit may be an acoustic dipole loudspeaker. The at least one second loudspeaker unit may be an acoustic dipole loudspeaker.

The first loudspeaker unit can be retained centrally in the headrest carrier. The at least one second loudspeaker unit can be retained in a laterally offset manner relative to the first loudspeaker unit in the headrest carrier. The headrest may have two second loudspeaker units. The two second loudspeaker units can be arranged opposite each other laterally with respect to the first loudspeaker unit. The first loudspeaker unit can be arranged between the two second loudspeaker units.

The first loudspeaker unit may be a low-frequency loudspeaker. A low-frequency loudspeaker is also referred to as a bass loudspeaker or woofer. The low-frequency loudspeaker may be in the form of an open loudspeaker without speaker units, in particular diaphragm or wall-mounted loudspeakers. In particular, the low-frequency loudspeaker may be in the form of an acoustic dipole or an acoustic baffle loudspeaker. The first loudspeaker unit may be a loudspeaker unit which is known from WO 2019/121266 A1.

The second loudspeaker unit may be a mid-range loudspeaker. A mid-range loudspeaker is also referred to as a mid-tone speaker. The second loudspeaker unit may be a treble loudspeaker. A treble loudspeaker is also referred to as a tweeter. The second loudspeaker unit may be a combined mid-range/treble loudspeaker. For example, the second loudspeaker unit may be in the form of an open loudspeaker without speaker units, in particular a diaphragm loudspeaker, or a wall-mounted loudspeaker. In particular, the second loudspeaker unit may be in the form of an acoustic dipole or an acoustic baffle loudspeaker.

The headrest carrier may form an abutment face which is provided with a plurality of internal, flexible support elements. The abutment face can be formed by the support elements. The specific air flow resistance of the abutment face, in particular in the region of the support elements, may be less than 200 Pa s/m, in particular less than 100 Pa s/m, extremely preferably less than 25 Pa s/m.

The headrest carrier can be produced from a plastics material or a composite material. Such a headrest carrier can be produced in a cost-effective manner and also has good damping and support properties without using foamed materials (in a foam-free manner). In this case, the use of foamed materials can be dispensed with, particularly completely. For example, the headrest carrier is made from a shock-resistant elastoplastic or thermoplastic material, in particular a thermoplastic plastics material, polypropylene, urethane, polyurethane, polyethylene or polycarbonate acrylonitrile butadiene styrene (PC-ABS). Preferably, the headrest carrier is formed by injection-molding a material which is free from foamed plastics material or by multiple-component injection-molding from a plurality of plastics materials.

The support elements may form an ergonomically configured abutment face of the headrest carrier (also referred to as a headrest face). In particular, the support elements form a concave-formed abutment face. In this instance, the abutment face may be formed in such a concave manner that it has an abutment face which is greater than conventional headrest members. In particular, the headrest carrier with a concave-formed abutment face allows a head, in particular the back of the head of an occupant, to abut the abutment face and to be laterally supported.

The trim element can have a perforation in a region which covers the first loudspeaker unit and the at least one second loudspeaker unit and the abutment face. The headrest carrier and the trim element can have a perforation in a region which laterally covers the at least one second loudspeaker unit. The cover can have a perforation in a region which covers the first loudspeaker unit in a direction counter to the abutment face. The term "perforation" in the context of the present invention is generally intended to be understood to be a planar arrangement of holes, in particular for regularly configuring a hole pattern, with different or identical shapes and sizes of the holes.

The trim element can have a trim material and a foam layer. The trim element can have a textile trim material and a foam layer. The foam layer can be stitched to the trim material. The foam layer can have a thickness of up to 20 mm. The foam layer preferably has a thickness of up to 15 mm. The foam layer extremely preferably has a thickness of up to 10 mm. The foam layer can be a layer of acoustic foam.

At least one sound wave guide can be arranged between the first loudspeaker unit and the at least one second loudspeaker unit. Preferably, the first loudspeaker unit is arranged centrally between two second loudspeaker units, wherein a sound wave guide can be arranged in each case between the first loudspeaker unit and the second loudspeaker unit. The sound wave guide can be integrated in the headrest carrier. The sound wave guide preferably extends over the entire height of the first loudspeaker unit and/or over the entire height of the second loudspeaker unit. In a preferred embodiment, the sound wave guide allows the sound waves to be output forward and/or backward, preferably forward and backward.

The object is further achieved according to the invention by a vehicle seat having a backrest having a headrest according to the preceding description.

DESCRIPTION OF THE FIGURES

The invention is explained below with reference to an advantageous exemplary embodiment which is illustrated in the Figures and with reference to two variants of this exemplary embodiment. However, the invention is not limited to this exemplary embodiment. In the drawings.

DETAILED DESCRIPTION

Figure 1:
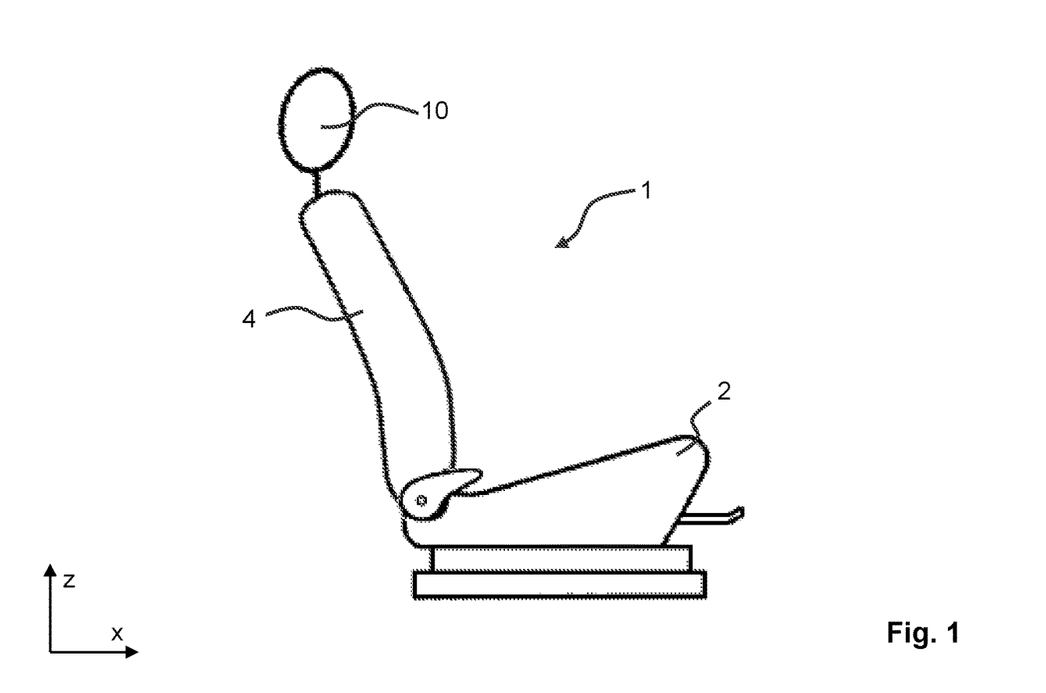
FIG. 1: shows a vehicle seat according to the invention with a headrest according to the invention.

FIG. 1 shows a vehicle seat 1 according to the invention with a headrest 10 according to the invention.

The vehicle seat 1 which is illustrated schematically in FIG. 1 has a seat member 2 and a backrest 4 and is described below using three spatial directions which extend perpendicularly to each other. A longitudinal direction x extends in a vehicle seat 1 which is fitted in the vehicle substantially horizontally and preferably parallel with a longitudinal vehicle direction which corresponds to the conventional travel direction of the vehicle. A transverse direction y which extends perpendicularly to the longitudinal direction x is also orientated horizontally in the vehicle and extends parallel with a transverse vehicle direction. A vertical direction z extends perpendicularly to the longitudinal direction x and perpendicularly to the transverse direction y. In a vehicle seat 1 which is fitted in the vehicle, the vertical direction z extends parallel with the vertical vehicle axis.

The position indications and direction indications used, such as, for example, front, rear, top, bottom and lateral, relate to a viewing direction of an occupant who is sitting in the vehicle seat 1 in the normal seating position, wherein the vehicle seat 1 is fitted in the vehicle, is in a position for use suitable for conveying persons with an upright backrest 4 and is orientated as usual in a travel direction. However, the vehicle seat 1 according to the invention can also be fitted in a different orientation, for example, transversely relative to the travel direction.

Figure 2:
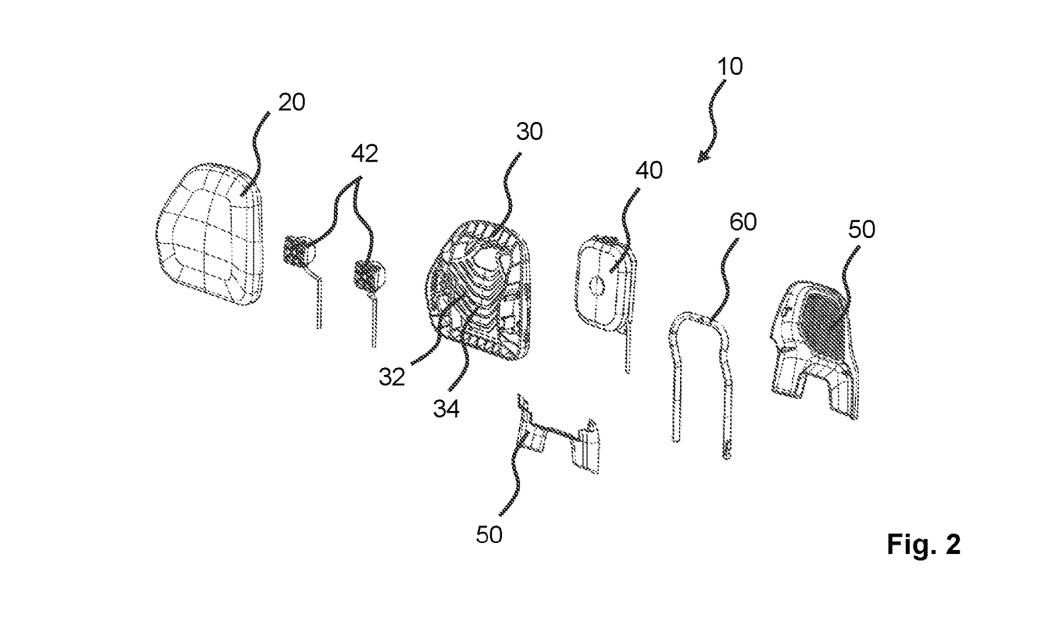
FIG. 2: shows an exploded illustration of the headrest.
Figure 3:
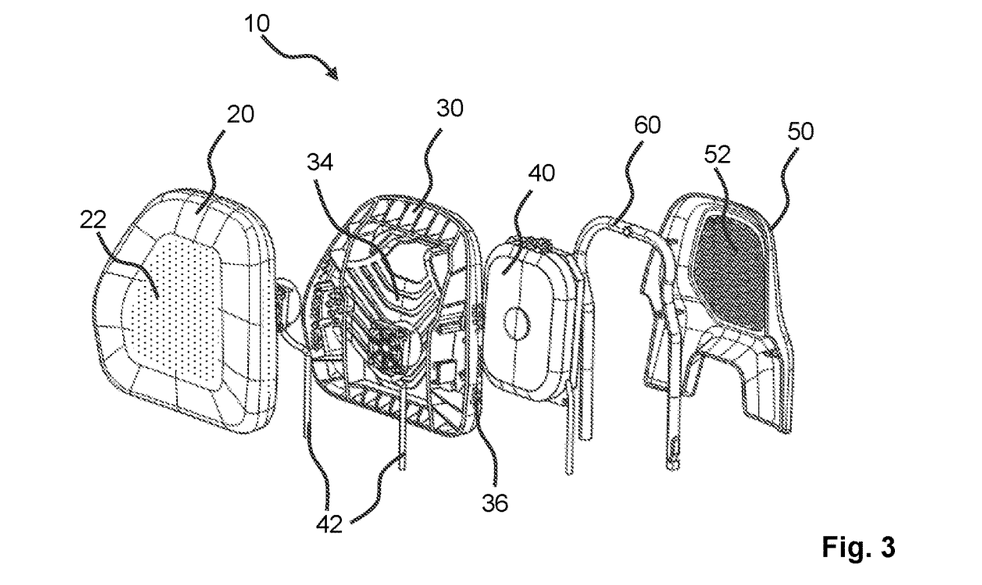
FIG. 3: shows an additional exploded illustration of the headrest.
Figure 4:
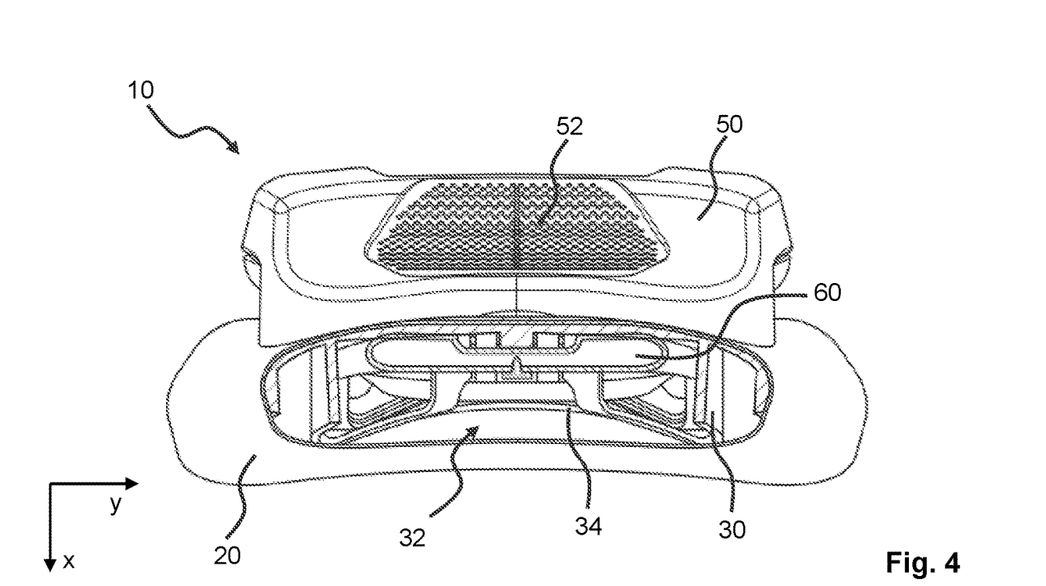
FIG. 4: shows a sectioned illustration of the headrest along the plane of section IV-IV from FIG. 8, FIG. 5: shows a sectioned illustration of the headrest along the plane of section V-V from FIG. 8, FIG. 6: shows a sectioned illustration of the headrest along the plane of section VI-VI from FIG. 8, FIG. 6A: shows a cutout of FIG. 6, supplemented by an optional sound wave guide according to a first variant.
Figure 5:
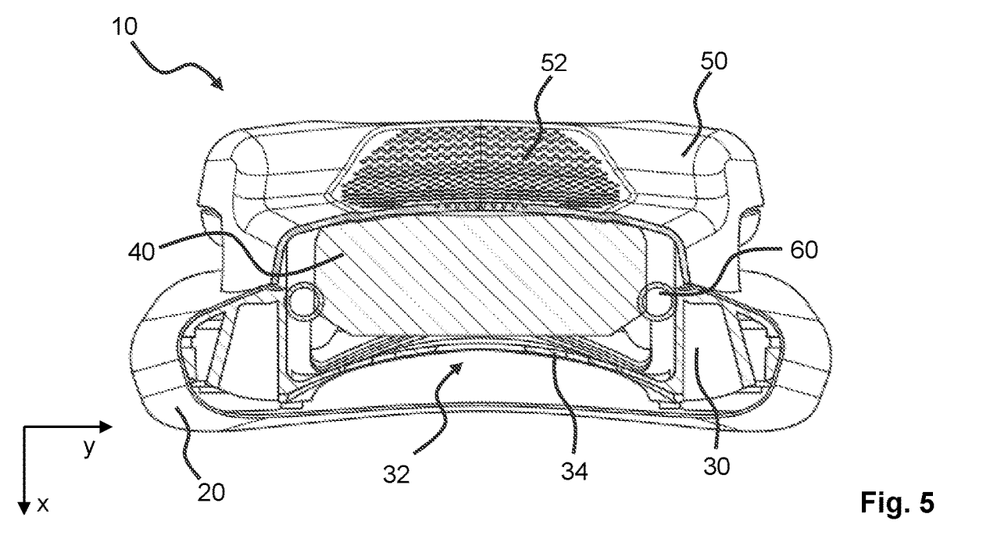
Figure 6:
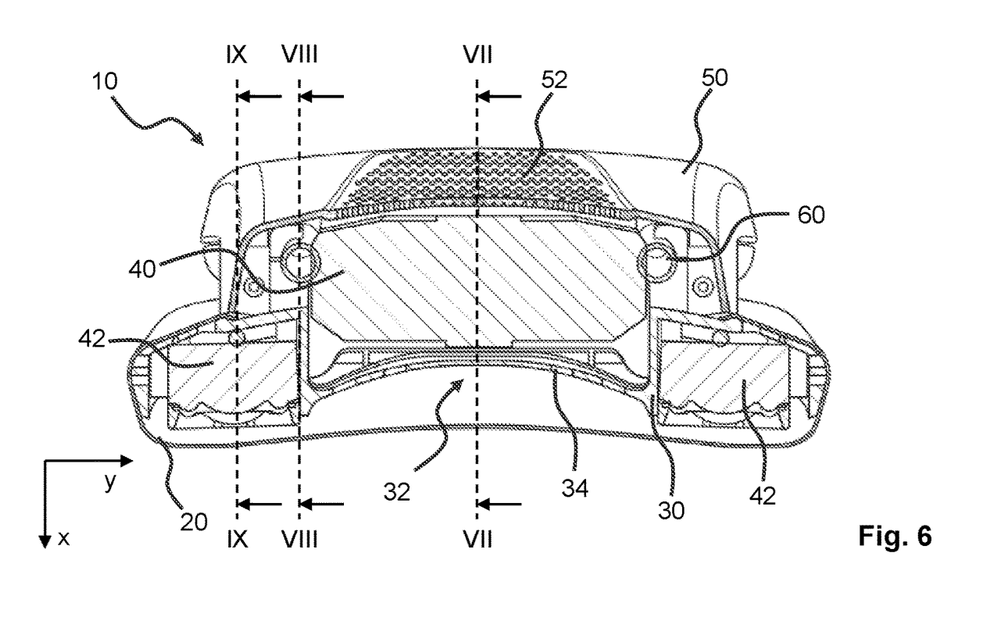
Figure 7:
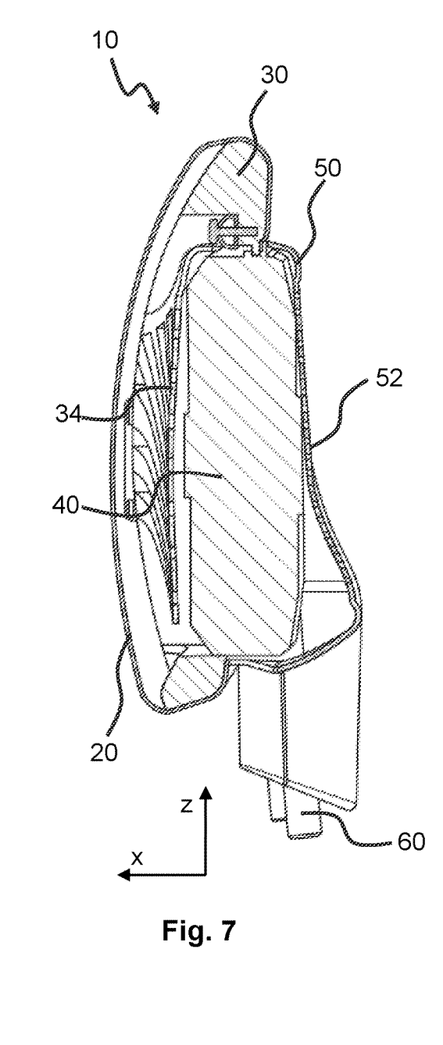
FIG. 7: shows a sectioned illustration of the headrest along the plane of section VII-VII from FIG. 6, FIG. 8: shows a sectioned illustration of the headrest along the plane of section VIII-VIII from FIG. 6, and FIG. 9: shows a sectioned illustration of the headrest along the plane of section IX-IX from FIG. 6.
Figure 8:
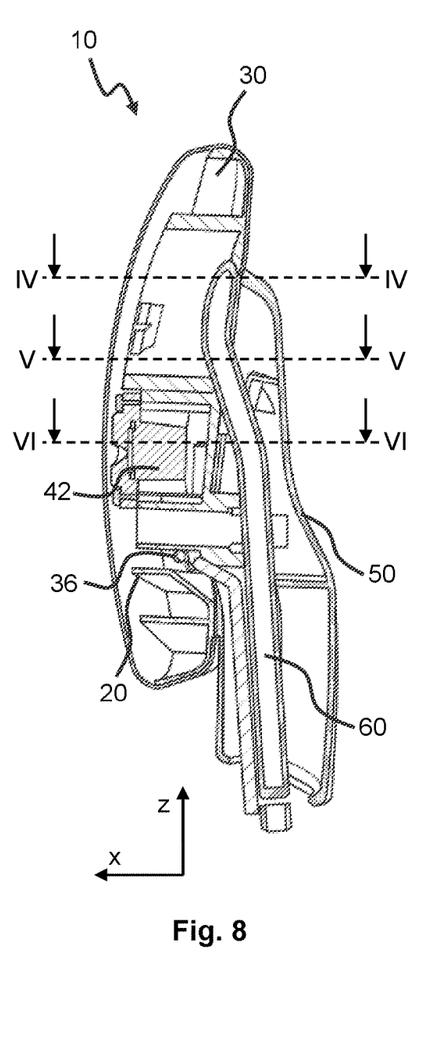
Figure 9:
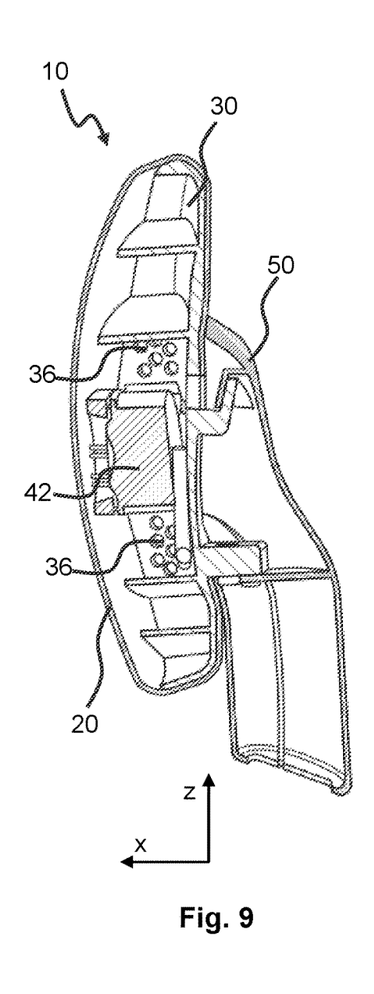

The headrest 10 is arranged at an upper edge of the backrest 4. FIGS. 2 and 3 show the headrest 10 in an exploded illustration. FIGS. 4 to 6 show the headrest 10 along different planes of section from FIG. 8. FIGS. 7 to 9 show sectioned illustrations of the headrest 10 along different planes of section from FIG. 6.

FIGS. 2 to 9 are described together below.

The headrest 10 has a trim element 20, a headrest carrier 30, a first loudspeaker unit 40, two second loudspeaker units 42 and a cover 50. The headrest 10 has a headrest retention member 60, by which the headrest 10 can be connected to a frame structure of the backrest 4 of the vehicle seat 1. The headrest retention member 60 may be able to be fixed to the frame structure. The headrest 10 may be vertically adjustable.

The first loudspeaker unit 40 and the two second loudspeaker units 42 are carried by the headrest carrier 30. To this end, the first loudspeaker unit 40 and the two second loudspeaker units 42 are retained in corresponding recesses of the headrest carrier 30 in a positive-locking and/or non-positive-locking manner. The first loudspeaker unit 40 and/or the two second loudspeaker units 42 can be clip-fitted in the headrest carrier 30.

The trim element 20 covers the headrest carrier 30, the first loudspeaker unit 40 and the two second loudspeaker units 42 at a front side of the headrest 10. The front side of the headrest 10 is used by the abutment face 32 to abut a head of an occupant of the vehicle seat 1. The cover 50 covers the headrest carrier 30, the first loudspeaker unit 40 and the two second loudspeaker units 42 in a backward direction. The cover 50 covers the headrest carrier 30, the first loudspeaker unit 40 and the two second loudspeaker units 42 at a side, which faces away from the abutment face 32, of the headrest 10. The abutment face 32 of the headrest carrier 30 is formed by a plurality of internal, flexible support elements 34.

The trim material is preferably an expansible textile, but may also be a layer of leather or synthetic leather. If the trim element 20 is made, for example, from an extensible textile, the trim element 20 has, in a region which covers the first loudspeaker unit 40 and the at least one second loudspeaker unit 42, a perforation 22 which is formed particularly by a changed mesh size or by holes. If the trim element 20 is made, for example, from leather or synthetic leather, the trim element 20 has in a region which covers the first loudspeaker unit 40 and the at least one second loudspeaker unit 42, a perforation 22 which is formed in particular by an arrangement of holes. The trim element 20 has, in a region which laterally covers the second loudspeaker units 42, an additional perforation 22 which is configured identically.

The trim element 20 preferably has a trim material and a foam layer. The foam layer is stitched to the trim material. A point-like adhesive bonding, which is distributed over a face, of the foam layer to the trim material is also conceivable. The foam layer is preferably a layer of acoustic foam which is adapted to reduce inherent oscillations of the individual components of the headrest 10.

The cover 50 has, in a region which covers the first loudspeaker unit 40 at a side which faces away from the abutment face 32, a perforation 52. The headrest carrier 30 has, in a region which laterally covers the second loudspeaker units 42, a perforation 36.

The perforations 22 of the trim element 20, the perforation 36 of the headrest carrier 30 and the perforation 52 of the cover 50 are used to configure a propagation path of a sound pressure which is generated by the loudspeaker units 40, 42 to be as open as possible so that the sound pressure can be discharged forward and backward out of the trim element 20 or the cover 50 in an approximately non-influenced state, in particular in a non-damped state.

Figure 6A:
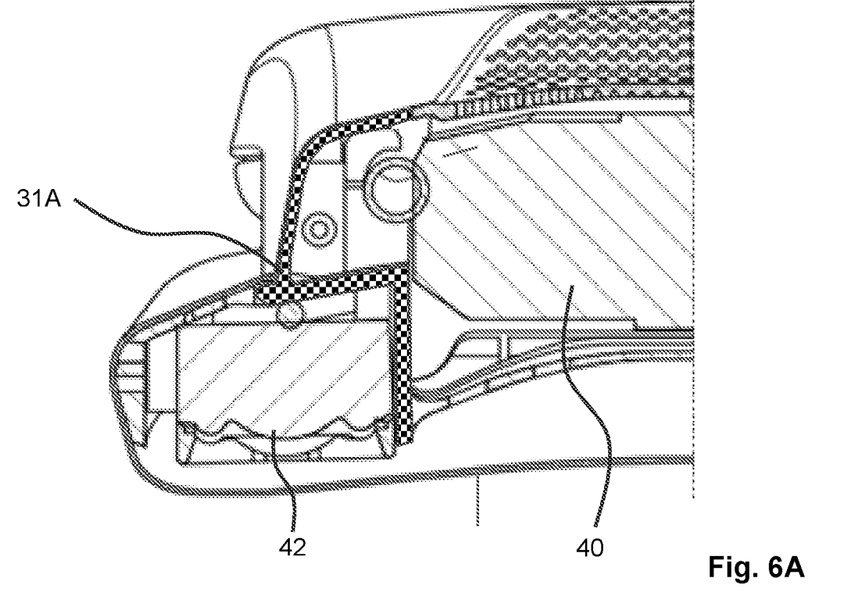
Figure 6B:
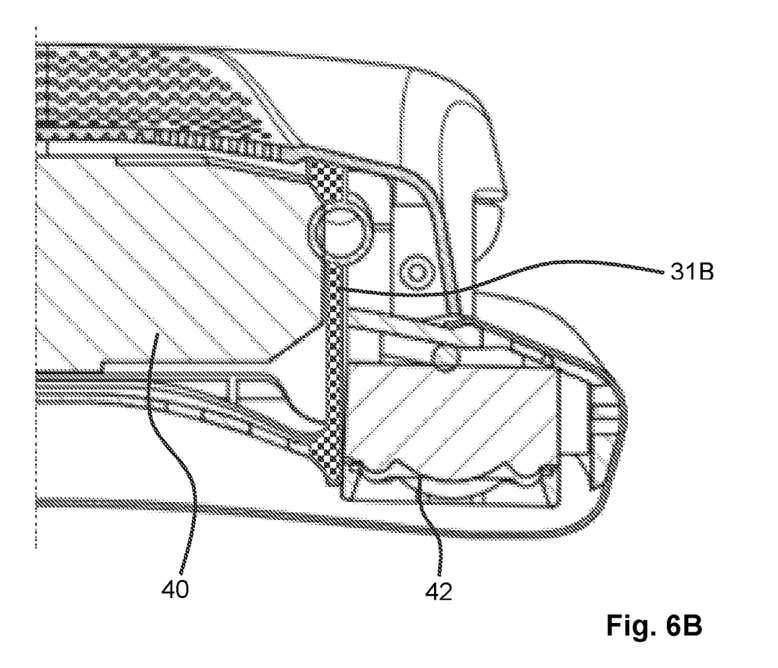
FIG. 6B: shows a cutout of FIG. 6, supplemented by an optional sound wave guide according to a second variant.

The headrest 10 can optionally have a sound wave guide 31A; 31B. FIG. 6a shows a dot-dash illustration of a sound wave guide 31A according to a first variant. FIG. 6B shows a dotted/shaded illustration of a sound wave guide 31B according to a second variant. The sound wave guides 31A; 31B are integrated in the headrest carrier 30 in this case. The sound wave guides 31A; 31B separate the first loudspeaker unit 40 acoustically from the second loudspeaker units 42 by the sound wave guides 31A; 31B each laterally separating a space for receiving the first loudspeaker unit 40 from a space for receiving the second loudspeaker unit 42. The sound of the first loudspeaker unit 40 can consequently be output only forward through the trim element 20 and backward through the cover 50. The sound waves of the first loudspeaker unit 40 can thereby interfere substantially only spatially in front of the trim element 20 and behind the cover 50 with sound waves of the second loudspeaker units 42. It is thereby possible to significantly improve the sound quality and furthermore to better provide the headrest 10 with an active noise suppression, also known as Active Noise Cancellation.

The features disclosed in the above description, claims and drawings may be significant both individually and together for carrying out the invention in its various embodiments as long as they are within the scope of protection of the independent patent claims.

LIST OF REFERENCE NUMERALS

1 Vehicle seat
2 Seat member
4 Backrest
10 Headrest
20 Trim element
22 Perforation
30 Headrest carrier
31a Sound wave guide
31b Sound wave guide
32 Abutment face
34 Support element
36 Perforation
40 First loudspeaker unit
42 Second loudspeaker unit
50 Cover
52 Perforation
60 Headrest retention member
x Longitudinal direction
y Transverse direction
z Vertical direction

What is claimed is:

1. A headrest for a vehicle seat, comprising:
a headrest carrier,
a first loudspeaker unit and at least one second loudspeaker unit, wherein the first loudspeaker unit and the at least one second loudspeaker unit are carried by the headrest carrier, the headrest further having a trim element and a cover, wherein the trim element covers the headrest carrier, the first loudspeaker unit and the at least one second loudspeaker unit in the direction of an abutment face, and the cover covers the headrest carrier, the first loudspeaker unit and the at least one second loudspeaker unit in a direction counter to the abutment face, wherein the trim element, the headrest carrier and the cover are configured in such a manner that a sound, which is generated by the first loudspeaker unit, can be output from the headrest to an external environment of the headrest in a substantially non-damped manner.

2. The headrest as claimed in claim 1, wherein the specific air flow resistance of the trim element is less than 200 Pa s/m.

3. The headrest as claimed in claim 1, wherein the specific air flow resistance of the cover is less than 200 Pa s/m.

4. The headrest as claimed in claim 1, wherein the headrest carrier has the abutment face which is provided with a plurality of internal, flexible support elements formed thereby.

5. The headrest as claimed in claim 4, wherein the specific air flow resistance of the abutment face is less than 200 Pa s/m.

6. The headrest as claimed in claim 1, wherein the trim element has a perforation in a region which covers the first loudspeaker unit, the at least one second loudspeaker unit and the abutment face.

7. The headrest as claimed in claim 1, wherein the headrest carrier and the trim element have a perforation in a region which laterally covers the at least one second loudspeaker unit.

8. The headrest as claimed in claim 1, wherein the cover has a perforation in a region which covers the first loudspeaker unit in a direction counter to the abutment face.

9. The headrest as claimed in claim 1, wherein the trim element has a trim material and a foam layer.

10. The headrest as claimed in claim 9, wherein the foam layer is stitched to the trim material.

11. The headrest as claimed in claim 9, wherein the foam layer has a thickness of up to 20 mm.

12. The headrest as claimed in claim 9, wherein the foam layer is a layer of acoustic foam.

13. The headrest as claimed in claim 1, wherein at least one sound wave guide is arranged between the first loudspeaker unit and the at least one second loudspeaker unit.

14. The headrest as claimed in claim 13, wherein the sound wave guide is integrated in the headrest carrier.

15. A vehicle seat having a backrest having the headrest as claimed in claim 1.

* * * * *